US012723936B2

(12) United States Patent
Huang

(10) Patent No.: US 12,723,936 B2
(45) Date of Patent: Sep. 1, 2026

(54) PRESSURE GAUGE

(71) Applicant: Zhongshan Fumao Seal Technology Co., Ltd., Zhongshan (CN)

(72) Inventor: Changqing Huang, Zhongshan (CN)

(73) Assignee: Zhongshan Fumao Seal Technology Co., Ltd., Zhongshan (CN)

(*) Notice: Subject to any disclaimer, the term of this patent is extended or adjusted under 35 U.S.C. 154(b) by 304 days.

(21) Appl. No.: 18/610,270

(22) Filed: Mar. 20, 2024

(65) Prior Publication Data

US 2024/0319030 A1 Sep. 26, 2024

(30) Foreign Application Priority Data

Mar. 20, 2023 (CN) ........................ 202310265985.X

(51) Int. Cl.
*G01L 7/08* (2006.01)
*G01L 7/02* (2006.01)

(52) U.S. Cl.
CPC .............. *G01L 7/084* (2013.01); *G01L 7/022* (2013.01)

(58) Field of Classification Search
CPC . G01L 7/02; G01L 7/022; G01L 7/024; G01L 7/08; G01L 7/082; G01L 7/084
See application file for complete search history.

(56) References Cited

U.S. PATENT DOCUMENTS 7,100,436 B2 * 9/2006 Chou ........................ G01B 3/28 73/146.8
9,581,509 B2 * 2/2017 Huang ...................... G01L 7/08
9,829,403 B2 * 11/2017 Wang ...................... G01L 7/084
11,262,260 B2 * 3/2022 Chou ...................... G01L 7/022

FOREIGN PATENT DOCUMENTS

CN 210221375 U 3/2020
CN 217586108 U 10/2022
CN 219301847 U 7/2023

* cited by examiner

*Primary Examiner* — Justin N Olamit
(74) *Attorney, Agent, or Firm* — JEEN IP LAW, LLC

(57) ABSTRACT

The present invention provides a pressure gauge, including: a housing, defined with an axial direction and a radial direction, and including internal space, an opening, and a through hole, where the opening communicates with the internal space along the axial direction, and the through hole communicates with the internal space along the radial direction. Compared with the prior art, the present invention has the following beneficial effects: the thickness of the pressure gauge can be further reduced, the first channel can further block the force equalized plate in the radial direction, to enable the force equalized plate to be firmly positioned.

7 Claims, 7 Drawing Sheets

PRESSURE GAUGE

CROSS-REFERENCE TO RELATED APPLICATIONS

The application claims priority to Chinese patent application No. 202310265985.X, filed on Mar. 20, 2023, the entire contents of which are incorporated herein by reference.

TECHNICAL FIELD

The present invention belongs to the field of pressure gauge devices, and in particular, relates to a pressure gauge.

BACKGROUND

Pressure gauges are apparatuses installed on storage devices such as pipelines, valve bodies, or cylinders to display internal pressures. According to different use requirements and measurement targets, the pressure gauges may be roughly divided into a Bourdon tube pressure gauge, a diaphragm pressure gauge, an explosion-proof pressure gauge, an explosion-proof electrical contact pressure gauge, a vacuum pressure gauge, and the like. The diaphragm pressure gauge is used for measuring acid-base, high-viscosity, and easily solidified media, and can be widely used. Therefore, the diaphragm pressure gauge is common in daily life and processing plants. For example, a pressure gauge disclosed in Taiwan Patent No. M482064 falls into this category.

However, the overall thickness of the pressure gauge disclosed in Taiwan Patent No. M482064 is relatively great, requiring more assembly space for assembly and use. Although the combination of a gauge housing and a base is supplemented by screws, in the event of a collision, an assembly gap or structural deformation may still be caused between the gauge housing and the base, leading to inaccuracy in measurement.

Therefore, it is necessary to provide a novel and progressive pressure gauge to resolve the foregoing problem.

SUMMARY

To overcome shortcomings in the existing technologies, the present invention is intended to provide a pressure gauge, to resolve the problem raised in the background.

The present invention is implemented by using the following technical solutions: A pressure gauge, including:

- a housing, defined with an axial direction and a radial direction, and including internal space, an opening, and a through hole, where the opening communicates with the internal space along the axial direction, and the through hole communicates with the internal space along the radial direction;
- a base, accommodated in the internal space and including a first channel and a second channel, the first channel extends along the axial direction and faces the opening, and the second channel extends along the radial direction and faces the through hole, the second channel laterally communicates with the first channel, and the second channel is connected to and communicates with an assembly pipe that penetrates the through hole; and
- an arched frame, covering the base along the axial direction, to jointly define an accommodating chamber;
- a pressure sensing unit, including a diaphragm and a connecting base, where the connecting base is positioned on the diaphragm, and the diaphragm is accommodated in the accommodating chamber and is sandwiched between the arched frame and the base;
- a gauge core unit, including a rotating shaft, a torsion spring, a spiral base, a pointer, and a gauge panel, where the gauge panel is disposed on a side, facing away from the base, of the arched frame, one end of the rotating shaft is plugged into the connecting base, and the other end of the rotating shaft penetrates the gauge panel, the pointer is disposed at the other end of the rotating shaft for synchronous rotation with the rotating shaft, the torsion spring is sleeved on the rotating shaft, and the spiral base is positioned on the connecting base and abuts against the torsion spring; and
- a push rod, movably accommodated in the first channel, and driven by fluid from the assembly pipe to push against the pressure sensing unit, where the pressure sensing unit also includes a force equalized plate, the force equalized plate is between the diaphragm and the push rod, when the push rod is approaching the pressure sensing unit, the push rod drives the force equalized plate to push against the diaphragm to deform, an accommodating hole is recessed on a side, facing the diaphragm, of the force equalized plate, and when the force equalized plate pushes against the diaphragm, the connecting base extends into the accommodating hole.

After the foregoing technical solutions are used, the present invention has the following beneficial effects. The thickness of the pressure gauge can be further reduced, the first channel can further block the force equalized plate in the radial direction, to enable the force equalized plate to be firmly positioned.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

Figure 1:
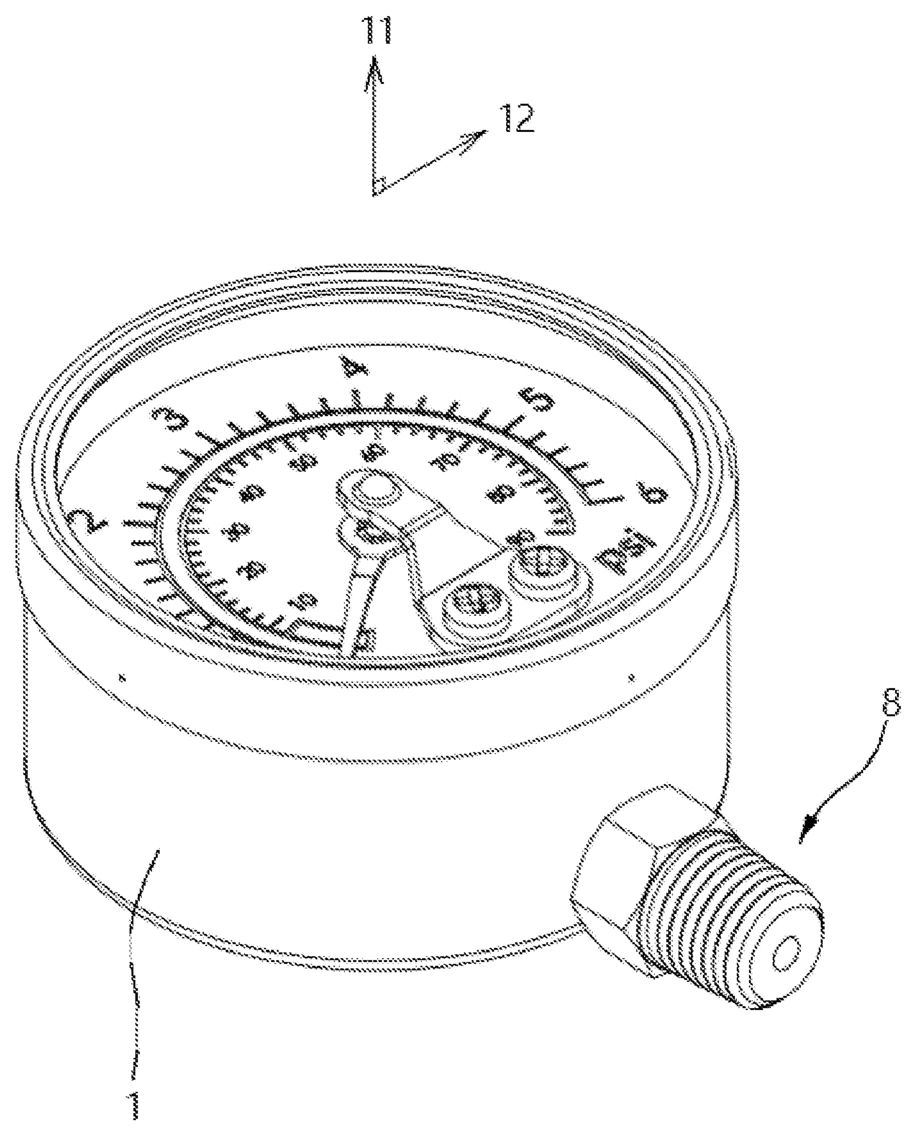
FIG. 1 is a three-dimensional view according to a first embodiment of an embodiment of the present invention.
Figure 2:
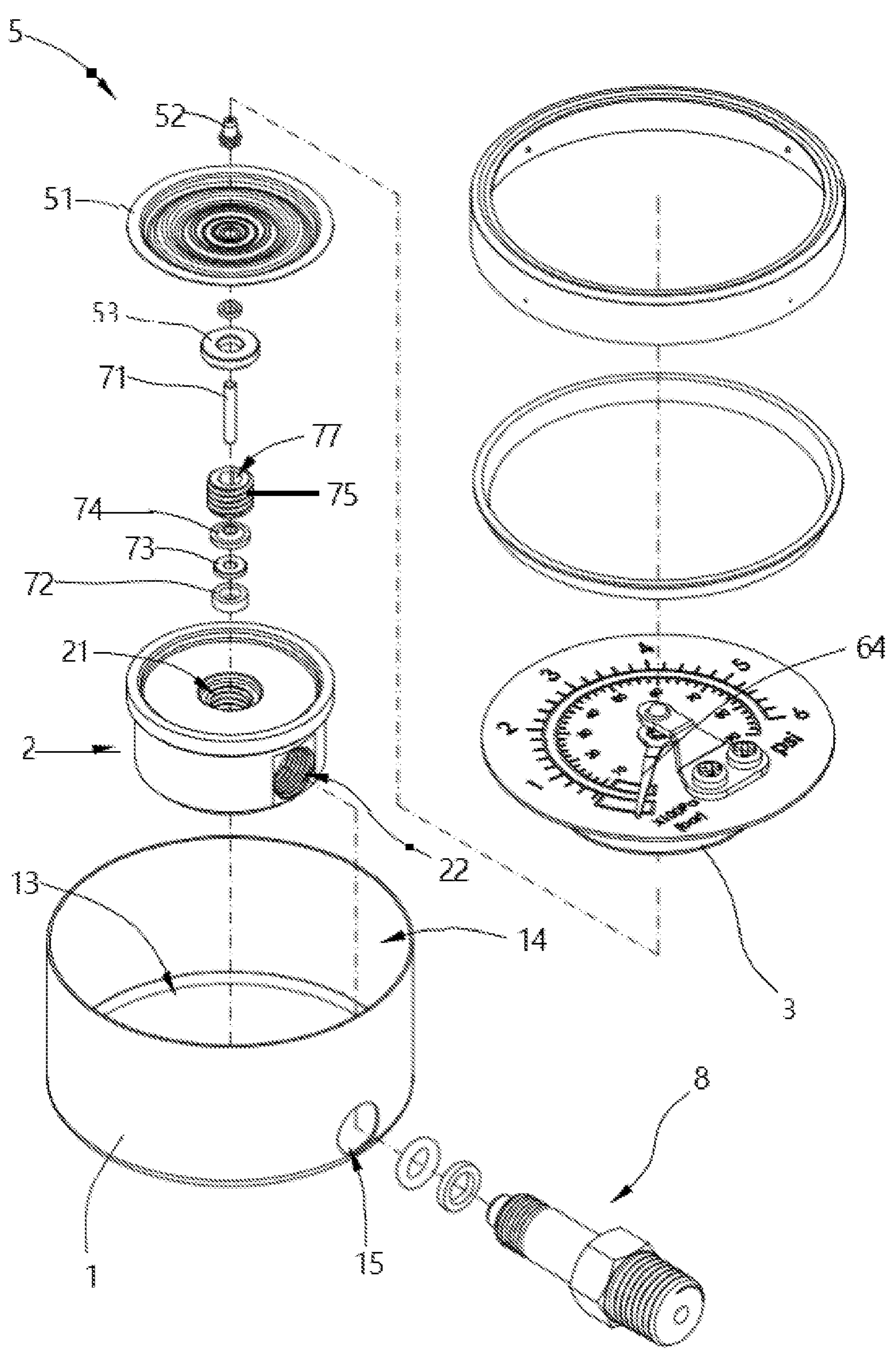
FIG. 2 is an exploded view of FIG. 1.
Figure 3:
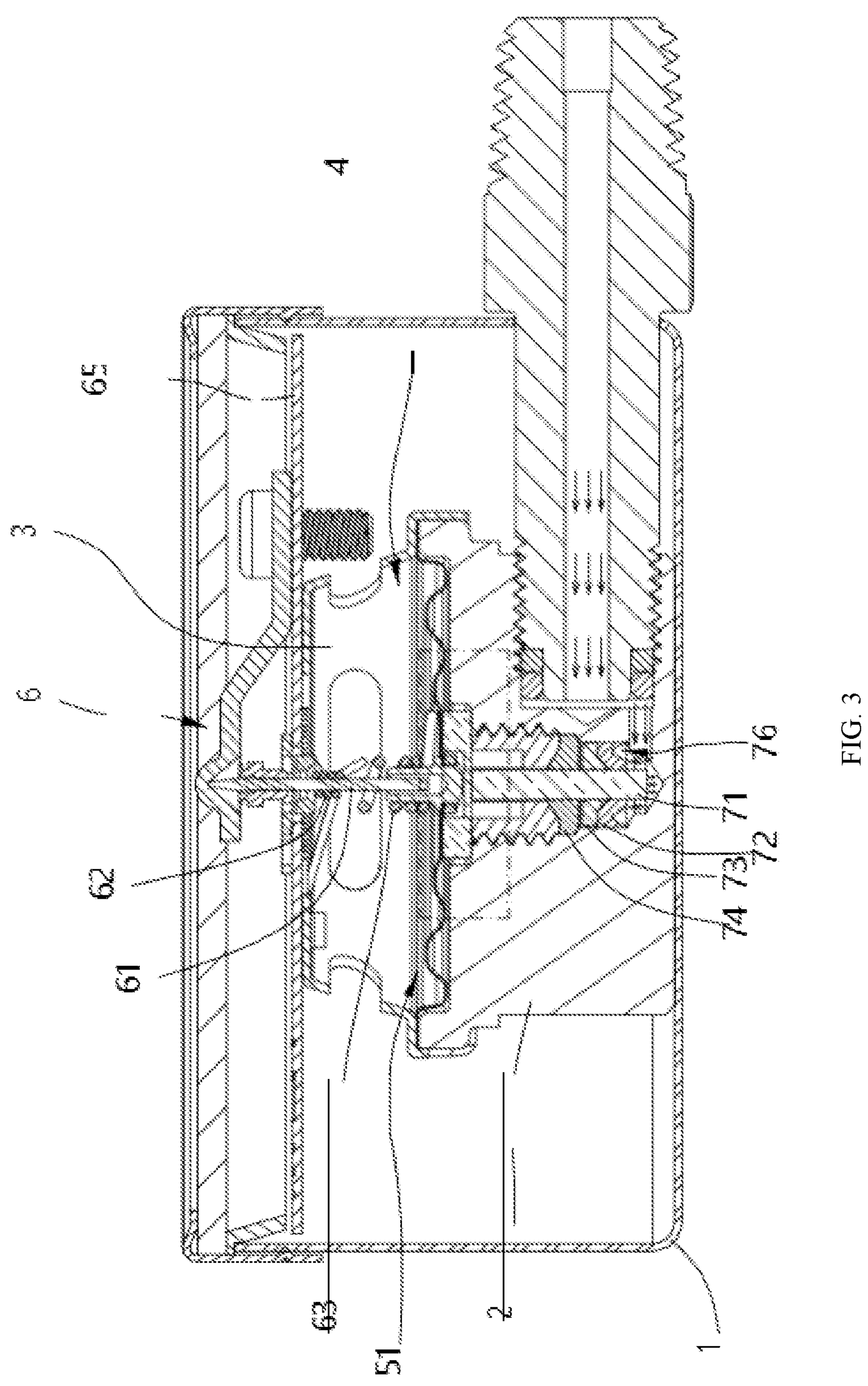
FIG. 3 is a sectional view of FIG. 1.
Figure 4:
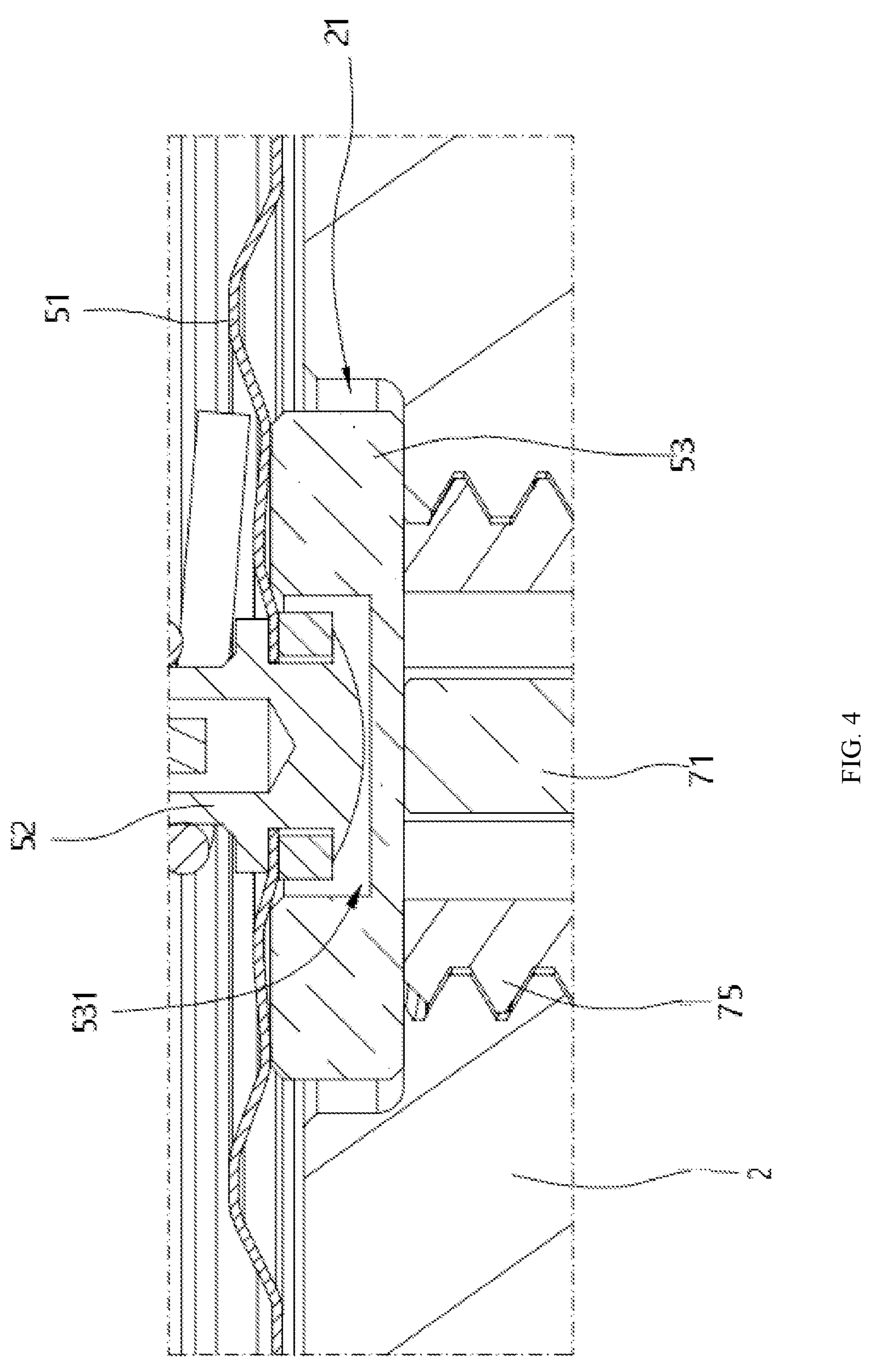
FIG. 4 and FIG. 5 are partial enlarged schematic diagrams of actuation according to the first embodiment of the present invention.
Figure 5:
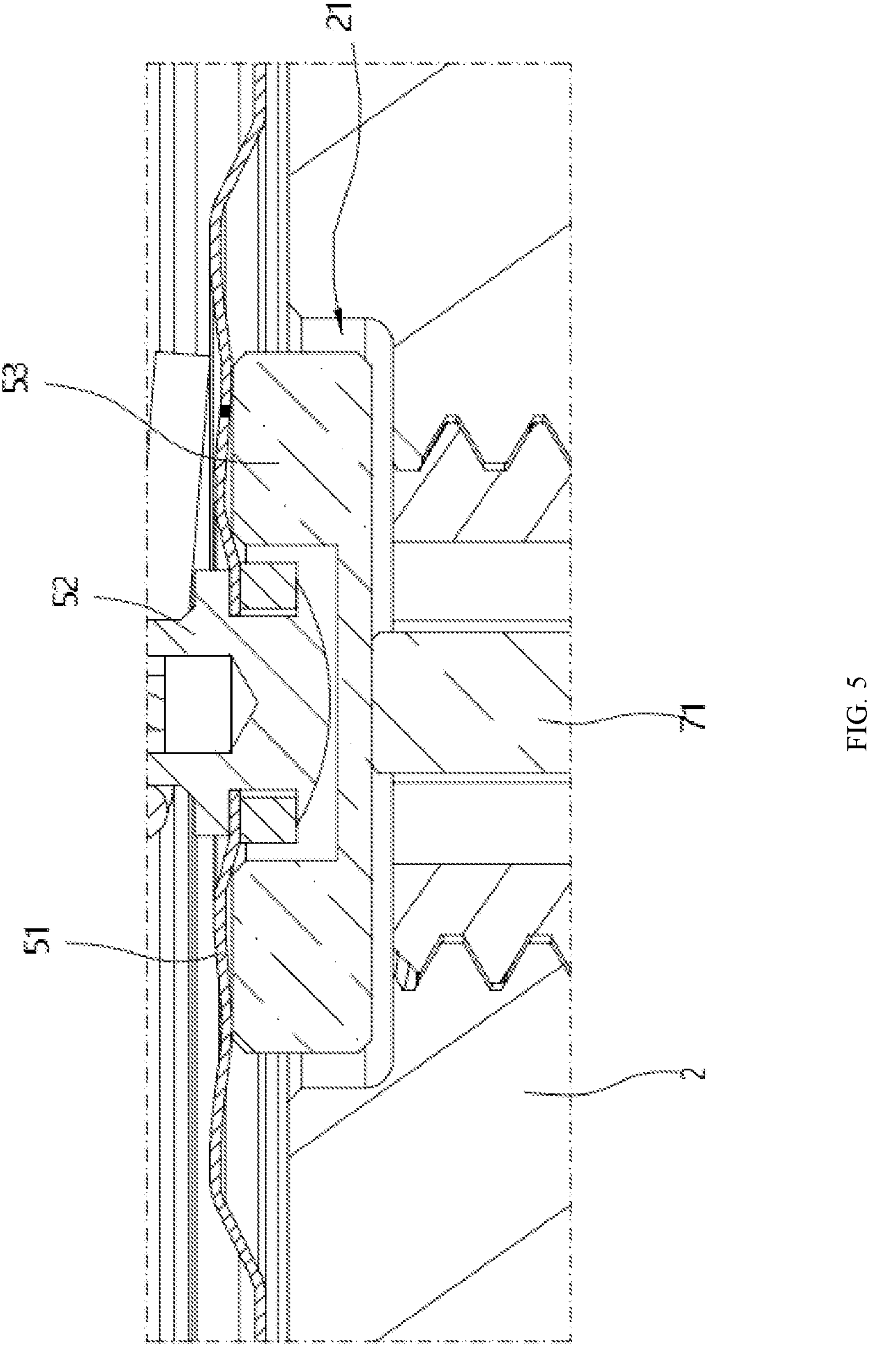

In the drawings, 1: housing, 11: axial direction, 12: radial direction, 13: internal space, 14: opening, 15: through hole, 2: base, 21: first channel, 22: second channel, 3: arched frame, 4: accommodating chamber, 5: pressure sensing unit, 51: diaphragm, 52: connecting base, 53: force equalized plate, 531: accommodating hole, 6: gauge core unit, 61: rotating shaft, 62: torsion spring, 63: spiral base, 64: pointer, 65: gauge panel, 71: push rod, 72, 72A: oil seal, 73,73A: back support ring, 74,74A: sealing ring, 75,75A: plugging base, 76: assembly space, 77: assembly hole, 8: assembly pipe.

DETAILED DESCRIPTION OF THE EMBODIMENTS

The following clearly and completely describes technical solutions in embodiments of the present invention with reference to accompanying drawings in the embodiments of the present invention. Apparently, the described embodiments are merely some but not all of the embodiments of the present invention. All other embodiments obtained by a person of ordinary skill in the art based on the embodiments of the present application without creative efforts shall fall within the protection scope of the present application.

Refer to FIG. 1 to FIG. 5, an embodiment of the present invention is shown. A pressure gauge of the present invention includes: a housing 1, a base 2, an arched frame 3, a pressure sensing unit 5, a gauge core unit 6, and a push rod 71.

The housing 1 is defined with an axial direction 11 and a radial direction 12, and includes internal space 13, an opening 14, and a through hole 15. The opening 14 communicates with the internal space 13 along the axial direction 11, and the through hole 15 communicates with the internal space 13 along the radial direction 12. The base 2 is accommodated in the internal space 13 and does not protrude from the housing 1. The housing 1 can effectively block interference from an external object and provide a stable environment for the base 2 from any direct collision.

Specifically, the base 2 includes a first channel 21 and a second channel 22. The first channel 21 extends along the axial direction 11 and faces the opening 14, and the second channel 22 extends along the radial direction 12 and faces the through hole 15. The second channel 22 laterally communicates with the first channel 21. The second channel 22 is connected to and communicates with an assembly pipe 8 that penetrates the through hole 15. Fluid (a medium) inside an object to be measured can flow into the second channel 22 through the assembly pipe 8. The base 2 is made of metal and has advantages of relative good structural strength, resistance to deformation, easy processing, acid and alkali resistance, and the like.

More specifically, the arched frame 3 covers the base 2 along the axial direction 11, to jointly define an accommodating chamber 4. The pressure sensing unit 5 includes a diaphragm 51 and a connecting base 52. The connecting base 52 is positioned on the diaphragm 51. In a first embodiment, the diaphragm 51 is wavy. The diaphragm 51 is accommodated in the accommodating chamber 4 and is sandwiched between the arched frame 3 and the base 2, thereby effectively dividing the accommodating chamber 4 into two non-connected regions, to prevent a measurement medium from causing damage to the gauge core unit 6.

The gauge core unit 6 includes a rotating shaft 61, a torsion spring 62, a spiral base 63, a pointer 64, and a gauge panel 65. The gauge panel 65 is disposed on a side, facing away from the base 2, of the arched frame 3. One end of the rotating shaft 61 is plugged into the connecting base 52, and the other end of the rotating shaft 61 penetrates the gauge panel 65. The pointer 64 is disposed at the other end of the rotating shaft 61 for synchronous rotation with the rotating shaft. The torsion spring 62 is sleeved on the rotating shaft 61. The spiral base 63 is positioned on the connecting base 52 and abuts against the torsion spring 62.

The push rod 71 is movably accommodated in the first channel 21, and the push rod 71 is driven by the fluid from the assembly pipe 8 to push against the pressure sensing unit 5. For example, the push rod 71 pushes against the diaphragm 51 to deform upward, and then the connecting base 52 pushes up the spiral base 63. The spiral base 63 causes the torsion spring 62 to drive the rotating shaft 61 and the pointer 64 to rotate correspondingly. A user can easily obtain a pressure value visually by using the pointer 64 and with the cooperation of the gauge panel 65. It is worth mentioning that in a manner in which the push rod 71 is driven through the medium to push against the diaphragm 51, a position at which the push rod 71 pushes against the diaphragm 51 can be effectively controlled, and a medium pressure can be prevented from being directly applied to the diaphragm 51.

Preferably, the pressure gauge also includes an oil seal 72, a back support ring 73, a sealing ring 74, and a plugging base 75. The plugging base 75 is screw-locked on the first channel 21, and the plugging base 75 and an inner wall of the first channel 21 jointly define assembly space 76. The sealing ring 74 is located in the assembly space 76 and is sandwiched between the plugging base 75 and the inner wall of the first channel 21. The back support ring 73 and the oil seal 72 are located in the assembly space 76 and abut against each other in the axial direction 11. The push rod 71 movably penetrates the back support ring 73, the oil seal 72, the sealing ring 74, and the plugging base 75.

In the first embodiment, the sealing ring 74 abuts against an end surface, facing away from the diaphragm 51, of the plugging base 75. In the axial direction 11, the sealing ring 74 blocks and limits the back support ring 73 and the oil seal 72. All components are stacked layer by layer along the axial direction 11. The structural configuration extremely facilitates assembly.

Figure 6:
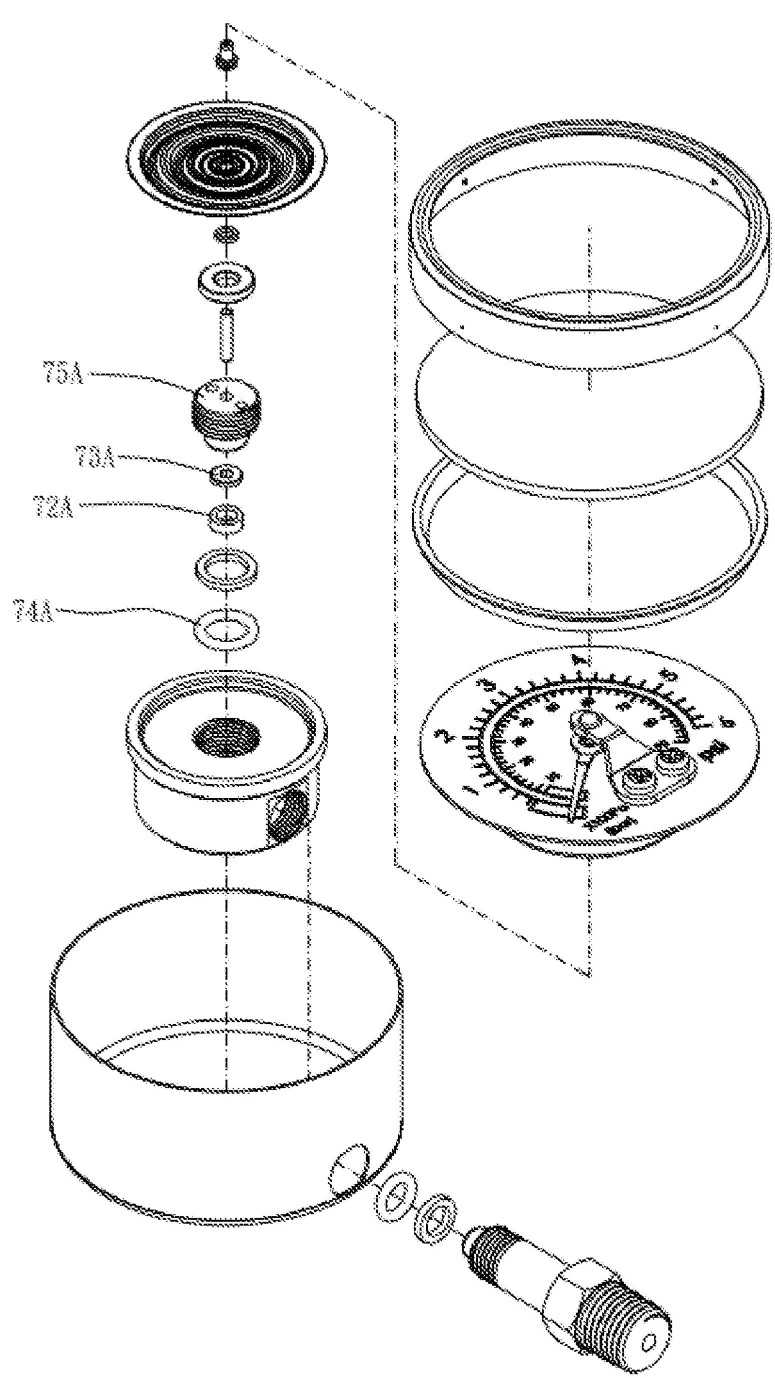
FIG. 6 is an exploded view according to a second embodiment of the present invention.
Figure 7:
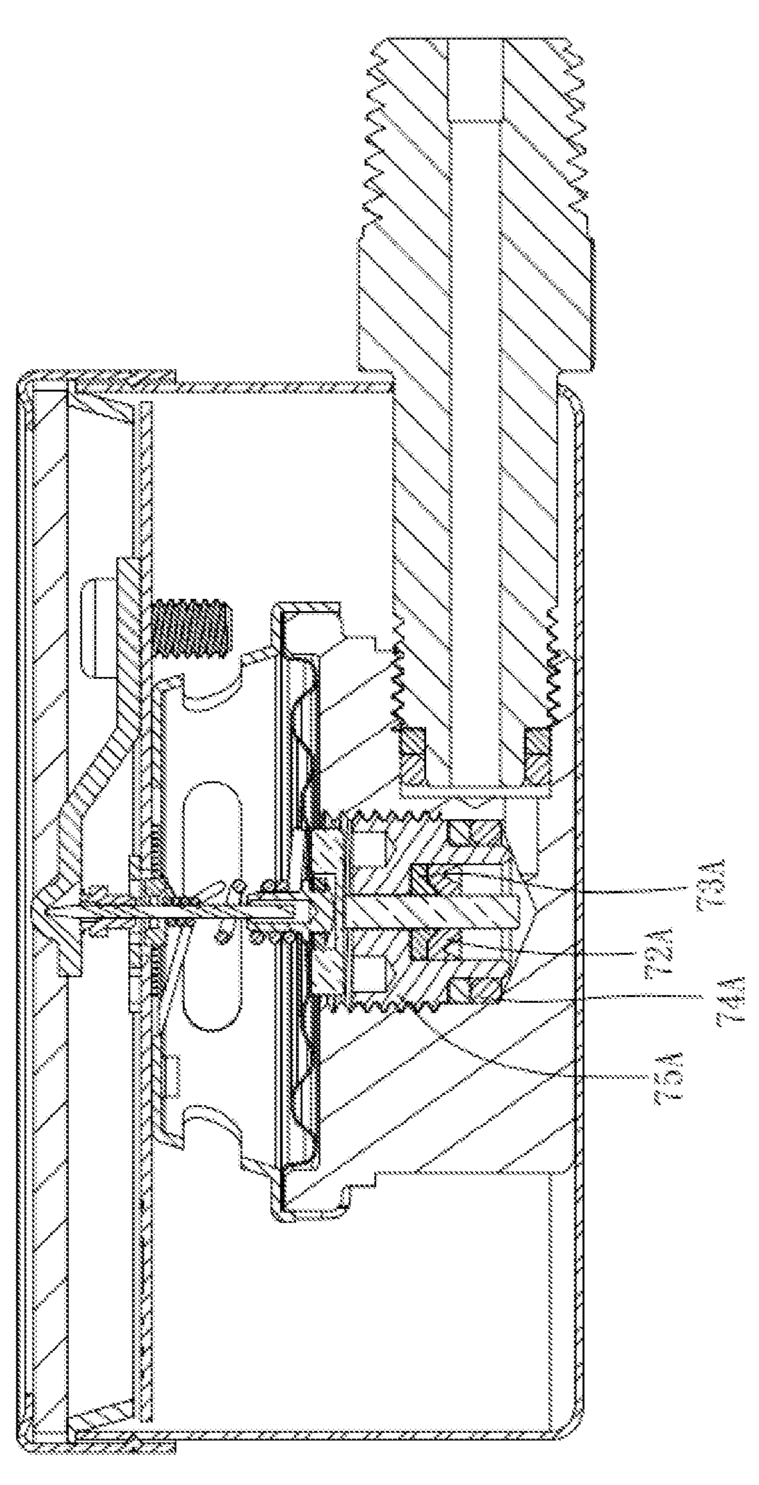
FIG. 7 is a sectional view according to a second embodiment of the present invention.

Of course, structural configuration is not limited to the foregoing structural configuration. Please further refer to a second embodiment shown in FIG. 6 and FIG. 7. A sealing ring 74A is sleeved on a plugging base 75A, and a back support ring 73A and an oil seal 72A are accommodated in the plugging base 75A. In the structural configuration, the sealing ring 74A, the back support ring 73A, the oil seal 72A, and the plugging base 75A may be assembled into one member and then inserted into a package. In the structural configuration, assembly is easy to perform, an overall length can be further shortened, and the thickness of the pressure gauge can be reduced.

Please further refer to the first embodiment in FIG. 1 to FIG. 5. One end, away from the diaphragm 51, of the first channel 21 does not penetrate the base 2 and is tapered, and therefore the end may be used to support the push rod 71 when not in use. When in use, fluid can also flow back to push the push rod 71.

Preferably, at least one assembly hole 77 is recessed on a side, facing the diaphragm 51, of the plugging base 75, and the at least one assembly hole 77 is to be inserted by a tool, to drive the plugging base 75 to rotate.

Still preferably, the plugging base 75 is buried in the first channel 21 and does not protrude from the base 2, to reduce an occupied volume and prevent unnecessary interference.

It is worth mentioning that the pressure sensing unit 5 also includes a force equalized plate 53. The force equalized plate 53 is between the diaphragm 51 and the push rod 71. When the push rod 71 is approaching the pressure sensing unit 5, the push rod 71 drives the force equalized plate 53 to push against the diaphragm 51 to deform. In the first embodiment, the force equalized plate 53, the push rod 71, the connecting base 52, and the rotating shaft 61 are coaxially arranged, to facilitate position control and design of related structural configuration. Moreover, a dimension, in the radial direction 12, of the force equalized plate 53 is greater than a dimension, in the radial direction 12, of the plugging base 75, to provide a relatively large contact area with the diaphragm 51 and to cover the at least one assembly hole 77 to prevent an unexpected object from falling. In addition, the force equalized plate 53 is made of metal, such as copper.

In detail, an accommodating hole 531 is recessed on a side, facing the diaphragm 51, of the force equalized plate 53. When the force equalized plate 53 pushes against the diaphragm 51, the connecting base 52 extends into the accommodating hole 531, to shorten an actuating length, thereby effectively shortening the thickness of the pressure gauge. The connecting base 52 does not abut against the force equalized plate 53 in the axial direction 11. In more detail, when the push rod 71 does not push against the force equalized plate 53, at least a part of the force equalized plate 53 is accommodated in the first channel 21, so that the thickness of the pressure gauge can be further reduced, the first channel 21 can further block the force equalized plate 53 in the radial direction 12, to enable the force equalized plate 53 to be firmly positioned.

The foregoing descriptions are merely preferred embodiments of the present invention, but are not intended to limit the present invention. Any modifications, equivalent substitutions, improvements, and the like made within the spirit and principle of the present invention should be included within the protection scope of the present invention.

What is claimed is:

1. A pressure gauge, comprising:

a housing, defined with an axial direction and a radial direction, and comprising internal space, an opening, and a through hole, wherein the opening communicates with the internal space along the axial direction, and the through hole communicates with the internal space along the radial direction;

a base, accommodated in the internal space and comprising a first channel and a second channel, the first channel extends along the axial direction and faces the opening, and the second channel extends along the radial direction and faces the through hole, the second channel laterally communicates with the first channel, and the second channel is connected to and communicates with an assembly pipe that penetrates the through hole;

an arched frame, covering the base along the axial direction, to jointly define an accommodating chamber;

a pressure sensing unit, comprising a diaphragm and a connecting base, wherein the connecting base is positioned on the diaphragm, and the diaphragm is accommodated in the accommodating chamber and is sandwiched between the arched frame and the base;

a gauge core unit, comprising a rotating shaft, a torsion spring, a spiral base, a pointer, and a gauge panel, wherein the gauge panel is disposed on a side, facing away from the base, of the arched frame, a first end of the rotating shaft is plugged into the connecting base, and a second end of the rotating shaft penetrates the gauge panel, the pointer is disposed at the second end of the rotating shaft for synchronous rotation with the rotating shaft, the torsion spring is sleeved on the rotating shaft, and the spiral base is positioned on the connecting base and abuts against the torsion spring; and a push rod, movably accommodated in the first channel, and driven by fluid from the assembly pipe to push against the pressure sensing unit, an oil seal, a back support ring, a sealing ring, and a plugging base, the plugging base is screw-locked on the first channel, the plugging base and an inner wall of the first channel jointly define assembly space, the sealing ring is located in the assembly space and is sandwiched between the plugging base and the inner wall of the first channel, the back support ring and the oil seal are located in the assembly space and abut against each other in the axial direction, and the push rod movably penetrates the back support ring, the oil seal, the sealing ring, and the plugging base;

wherein the pressure sensing unit also comprises a force equalized plate, the force equalized plate is between the diaphragm and the push rod, when the push rod is approaching the pressure sensing unit, the push rod drives the force equalized plate to push against the diaphragm to deform, an accommodating hole is recessed on a side, facing the diaphragm, of the force equalized plate, and when the force equalized plate pushes against the diaphragm, the connecting base extends into the accommodating hole.

2. The pressure gauge according to claim 1, wherein the sealing ring abuts against an end surface, facing away from the diaphragm, of the plugging base, and in the axial direction, the sealing ring blocks and limits the back support ring and the oil seal.

3. The pressure gauge according to claim 1, wherein the sealing ring is sleeved on the plugging base, and the back support ring and the oil seal are accommodated in the plugging base.

4. The pressure gauge according to claim 1, wherein the plugging base is buried in the first channel and does not protrude from the base.

5. The pressure gauge according to claim 1, wherein at least one assembly hole is recessed on a side, facing the diaphragm, of the plugging base, and the at least one assembly hole is to be inserted by a tool, to drive the plugging base to rotate.

6. The pressure gauge according to claim 1, wherein when the push rod does not push against the force equalized plate, at least a part of the force equalized plate is accommodated in the first channel.

7. The pressure gauge according to claim 1, wherein the force equalized plate, the push rod, the connecting base, and the rotating shaft are coaxially arranged; the connecting base does not abut against the force equalized plate in the axial direction; the diaphragm is wavy; one end, away from the diaphragm, of the first channel does not penetrate the base and is tapered; a dimension, in the radial direction, of the force equalized plate is greater than a dimension, in the radial direction, of the plugging base; the base is made of metal; and the force equalized plate is made of metal.

* * * * *